(12) United States Patent  (10) Patent No.: US 9,262,296 B1
Soeder et al.  (45) Date of Patent: Feb. 16, 2016

(54) STATIC FEATURE EXTRACTION FROM STRUCTURED FILES

(71) Applicant: Cylance Inc., Irvine, CA (US)

(72) Inventors: Derek A. Soeder, Irvine, CA (US); Ryan Permeh, Irvine, CA (US); Gary Golomb, Santa Cruz, CA (US); Matthew Wolff, Newport Beach, CA (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 14/169,808

(22) Filed: Jan. 31, 2014

(51) Int. Cl.
| G06F 9/44 | (2006.01) |
| G06F 11/00 | (2006.01) |
| G06F 12/14 | (2006.01) |
| G06F 12/16 | (2006.01) |
| G08B 23/00 | (2006.01) |
| G06F 11/36 | (2006.01) |

(52) U.S. Cl.
CPC ............ *G06F 11/3604* (2013.01); *G06F 11/36* (2013.01)

(58) Field of Classification Search
None
See application file for complete search history.

(56) References Cited

U.S. PATENT DOCUMENTS

| 6,430,590 | B1 | 8/2002 | Fischer |
| 6,546,551 | B1 | 4/2003 | Sweeney et al. |
| 7,240,048 | B2 | 7/2007 | Pontius |
| 7,937,705 | B1 | 5/2011 | Prael et al. |
| 7,945,902 | B1 | 5/2011 | Sahoo |
| 8,135,994 | B2 | 3/2012 | Keromytis et al. |
| 8,347,272 | B2 | 1/2013 | Sugawara et al. |
| 8,370,613 | B1 | 2/2013 | Manadhata et al. |
| 8,549,647 | B1 | 10/2013 | Mason et al. |
| 8,631,395 | B2 | 1/2014 | Sathyanathan et al. |
| 8,930,916 | B1 | 1/2015 | Soeder et al. |
| 2005/0049497 | A1 | 3/2005 | Krishnan et al. |
| 2006/0112388 | A1 | 5/2006 | Taniguchi et al. |
| 2008/0133571 | A1 | 6/2008 | O'Sullivan et al. |
| 2008/0288965 | A1 | 11/2008 | Grechanik et al. |
| 2009/0132449 | A1 | 5/2009 | Nagashima |
| 2009/0133125 | A1* | 5/2009 | Choi et al. ...................... 726/24 |
| 2010/0082513 | A1 | 4/2010 | Liu |
| 2010/0107170 | A1 | 4/2010 | Stehley |
| 2010/0318999 | A1 | 12/2010 | Zhao et al. |
| 2010/0325620 | A1 | 12/2010 | Rohde et al. |
| 2011/0004574 | A1 | 1/2011 | Jeong et al. |
| 2011/0138369 | A1 | 6/2011 | Chandra et al. |
| 2012/0079490 | A1 | 3/2012 | Bond et al. |

(Continued)

FOREIGN PATENT DOCUMENTS

EP 1762957 A1 3/2007

OTHER PUBLICATIONS

DaeMin Shin, "Data Hiding in Windown Executable Files", 2008, Australin Digital Forensic Soncference, Edith Cowan Unicersity.*

(Continued)

*Primary Examiner* — Jason Mitchell
*Assistant Examiner* — Mark Gooray
(74) *Attorney, Agent, or Firm* — Mintz Levin Cohn Ferris Glovsky and Popeo, P.C.

(57) ABSTRACT

Data is received or accessed that includes a structured file encapsulating data required by an execution environment to manage executable code wrapped within the structured file. Thereafter, code and data regions are iteratively identified in the structured file. Such identification is analyzed so that at least one feature can be extracted from the structured file. Related apparatus, systems, techniques and articles are also described.

25 Claims, 4 Drawing Sheets

(56) References Cited

U.S. PATENT DOCUMENTS

| | | | |
|---|---|---|---|
| 2012/0221497 | A1 | 8/2012 | Goyal et al. |
| 2013/0103380 | A1* | 4/2013 | Brandstatter et al. ............ 703/26 |
| 2013/0205279 | A1 | 8/2013 | Osminer et al. |
| 2013/0227683 | A1 | 8/2013 | Bettini et al. |
| 2013/0263097 | A1 | 10/2013 | Dawson et al. |
| 2013/0291111 | A1* | 10/2013 | Zhou et al. ...................... 726/23 |
| 2014/0180738 | A1 | 6/2014 | Phillipps et al. |
| 2014/0250429 | A1 | 9/2014 | Greiner et al. |
| 2014/0379619 | A1 | 12/2014 | Permeh et al. |

OTHER PUBLICATIONS

Iczelion's, "Tutorial 1: Overview of PE File format", Jun. 2013.*

Dahl et al. "Large-Scale Malware Classification Using Random Projections and Neural Networks." *2013 IEEE International Conference on Acoustics, Speech and Signal Processing (ICASSP)*. May 26-31, 2013. Vancouver, BC. pp. 3422-3426.

Eagle. "Chapter 1: Introduction to Disassembly." *The IDA Pro Book: The Unofficial Guide to the World's Most Popular Disassembler.* San Francisco: No Starch Press. 2nd Edition(2011):3-14.

Rieck et al. "Automatic analysis of malware behavior using machine learning." *Journal of Computer Security.* 19(2011):639-668.

Bird, Steven et al. "Annotation Tools Based on the Annotation Graph API." Jul. 2001. 4 pages.

De Campos, Luis M. et al. "Bayesian Networks Classifiers for Gene-Expression Data". Intelligent Systems Design and Applications (ISDA). 2011 11th International Conference on, IEEE, Nov. 22, 2011, pp. 1200-1206, XP032086221, DOI: 10.1109/ISDA.2011.6121822 ISBN: 978-1-4577-1676-8.

Nguyen, Hoan Anh et al. "A Graph-based Approach to API Usage Adaptation."*OOPSLA/SPLASH* 10. Oct. 17-21, 2010. Reno/Tahoe, Nevada, USA. Oct. 2010:(302-321).

Samak, Taghrid et al. "Online Fault and Anomaly Detection for Large-Scale Scientific Workflows". *High Performance Computing and Communications (HPCC)*, 2011 IEEE 13TH International Conference on, IEEE, Sep. 2, 2011, pp. 373-381, XP032068211, DOI: 10.1109/HPCC.2011.55 ISBN: 978-1-4577-1564-8.

Shabtai, A et al. "Detection of malicious code by applying machine learning classifiers on static features: A state-of-the-art survey". *Information Security Technical Report, Elsevier Advanced Technology*. Amsterdam, NL, vol. 14, No. 1, Feb. 1, 2009, pp. 16-29, XP026144093, ISSN: 1363-4127.

Xu, J-Y. et al. "Polymorphic Malicious Executable Scanner by API Sequence Analysis." *Proceedings of the Fourth International Conference on Hybrid Intelligent Systems. (HIS 2004)*. Kitakyushu, Japan. Dec. 5-8, 2004. Piscataway, NJ, USA,IEEE, Dec. 5, 2004, pp. 378-383, XP010778797.

"Data Type". *Wikipedia: The Free Encyclopedia.* Wikimedia Foundation, Inc. Jul. 20, 2015. Web.

"File System". *Wikipedia: The Free Encyclopedia.* Wikimedia Foundation, Inc. Jul. 11, 2015. Web.

Inoue, Hajime "Anomaly Detection in Dynamic Execution Environments." Abstract of Dissertation. Jan. 31, 2005. XP055191583. ISBN: 978-0-54-249408-6. 190 pages.

Stolfo, Salvatore J. et al. "Anomaly Detection in Computer Security and an Application to File System Accesses". In: "Lecture Notes in Computer Science". Jan. 31, 2005. M.S Hacid et al. (Eds):ISMIS 2005, LNAI. Springer. Berlin, Heidelberg. XP055192090. vol. 3488:14-28.

Wang, Xun et al. "Detecting Worms via Mining Dynamic Program Execution." Third International Conference on Security and Privacy in Communications Networks and the Workshops, 2007. Securecomm 2007. IEEE. Piscataway, NJ, USA. Sep. 17, 2007 pp. 412-421. XP031276575. ISBN: 978-1-4244-0974-7.

* cited by examiner

300

```
{
  "IMAGE_DOS_HEADER":
  {
    "e_magic": ...,
    "e_cblp": ...,
    "e_cp": ...,
    ...,
    "e_res2: [ ... ],
    "e_lfanew": ...
  },
  "RichData":
  {
    "Checksum": ...,
    "Reserved": [ ... ],
    ...
  },
  "IMAGE_NT_HEADERS":
  {
    "Signature": ...,
    "FileHeader":
    {
      "Machine": ...,
      "NumberOfSections": ...,
      "TimeDateStamp": ...,
      "PointerToSymbolTable": ...,
      "NumberOfSymbols": ...,
      "SizeOfOptionalHeader": ...,
      "Characteristics": ...
    },
    "OptionalHeader":
    {
      "Magic": ...,
      ...
    }
  },
  "IMAGE_SECTION_HEADER":
  [
    {
      "Name": "...",
      "VirtualSize": ...,
      ...
    },
    ...
  ],
  ...
}
```

*FIG. 3*

STATIC FEATURE EXTRACTION FROM STRUCTURED FILES

TECHNICAL FIELD

The subject matter described herein relates to extracting machine learning features from structured files such as Portable Executable format files.

BACKGROUND

Structured files such as Portable Executable format files encapsulate information required for execution environment loaders to manage wrapped executable code. Portable Executable (PE) format files are the types of structured files used by the WINDOWS operating system and include executables, object code, DLLs, FON Font files, and other file types. Structured files can comprise additional data including resources (for example, images and text) and descriptive and prescriptive metadata and, as such, are often used for malicious purposes such as insertion of malware.

SUMMARY

In one aspect, data is received or accessed that includes a structured file encapsulating data required by an execution environment to manage executable code wrapped within the structured file. Thereafter, code and data regions are iteratively identified in the structured file. Such identification is analyzed so that at least one feature can be extracted from the structured file.

The structured file can take varying forms including, but not limited to, Portable Executable (PE) format files, Disk Operating System (DOS) executable files, New Executable (NE) files, Linear Executable (LE) files, Executable and Linkable Format (ELF) files, JAVA Archive (JAR) files, and SHOCKWAVE/FLASH (SWF) files.

The execution environment can be, for example, an operating system or a virtual machine.

In some variations, it can be determined that the structured file is valid by examining at least one header within the structured file to determine whether it encapsulates a valid signature.

The extracted at least one feature can be a first order feature. The extracted at least one first order feature can be derived into a higher-order feature.

In addition, negative space can be analyzed within the structured file to extract at least one additional feature. In this regard, negative space is different from the identified code and data regions.

The extracted at least one feature can be transformed. Example transformations can include one or more of sanitizing the extracted at least one feature, truncating the extracted at least one feature, or encoding at least a portion of the at least one feature.

Identifying code and data regions in the structured file can include parsing and disassembling the structured file. Data within the structured file can be arranged hierarchically and the structured file can include a top level header encapsulating a first data structure that encapsulates a second data structure.

Iteratively identifying code and data regions in the structured file can include identifying types of code and/or data regions in the structured file.

The extracted at least one feature can, in some cases, be provided to a machine learning model for consumption/use by the model. The at least one feature can be extracted such that no further/intermediate processing is required for the model to use such feature(s).

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter can be used to extract features from code within structured format files (e.g., PE format files, etc.) which, in turn, can be used to identify potentially malicious aspects of such code.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a diagram illustrating extracted features from a structured file; and

Like reference symbols in the various drawings indicate like elements.

DETAILED DESCRIPTION

The current subject matter is directed to feature extraction from structured files, such as PE format files, that harvests essentially all documented fields of the structured file format, as well as fields for which no official documentation publicly exists and fields of common structures not covered in the relevant specifications (e.g., PE specification, etc.), such as RFC 4122 Universally Unique Identifiers, Microsoft Visual-BASIC and .NET Framework code and data, and Multilingual User Interface (MUI) resources. The current subject matter can also be used to analyze expanses of code within the structured files and extract as features various tokenizations and derivations of the code. Furthermore, the current subject matter enables deriving features from "negative space" in the structured files which does not correspond to any identifiable code or data.

While the current subject matter describes the application of the current subject matter to Portable Executable (PE) format files, it will be appreciated that the methodologies described herein can be applied to other types of structured files such as DOS executable files, New Executable (NE) files, Linear Executable (LE) files, Executable and Linkable Format (ELF) files, Java Archive (JAR) files, Shockwave/Flash (SWF) files, and so on. The term structured file, as used herein, refers to files that encapsulate data required by an execution environment to manage executable code wrapped within the structured file.

This process of feature extraction may be referred to as static analysis, in that the static (unchanging) content of the file is examined; its dynamic (changing) state during execution and the side effects of its execution are not considered, as the file is not executed. Static analysis is often much faster, much less resource-intensive, and more comprehensive than dynamic analysis, while dynamic analysis can be easier to implement and can make use of an instrumented, existing execution environment as a source of environment-specific information.

Figure 1:
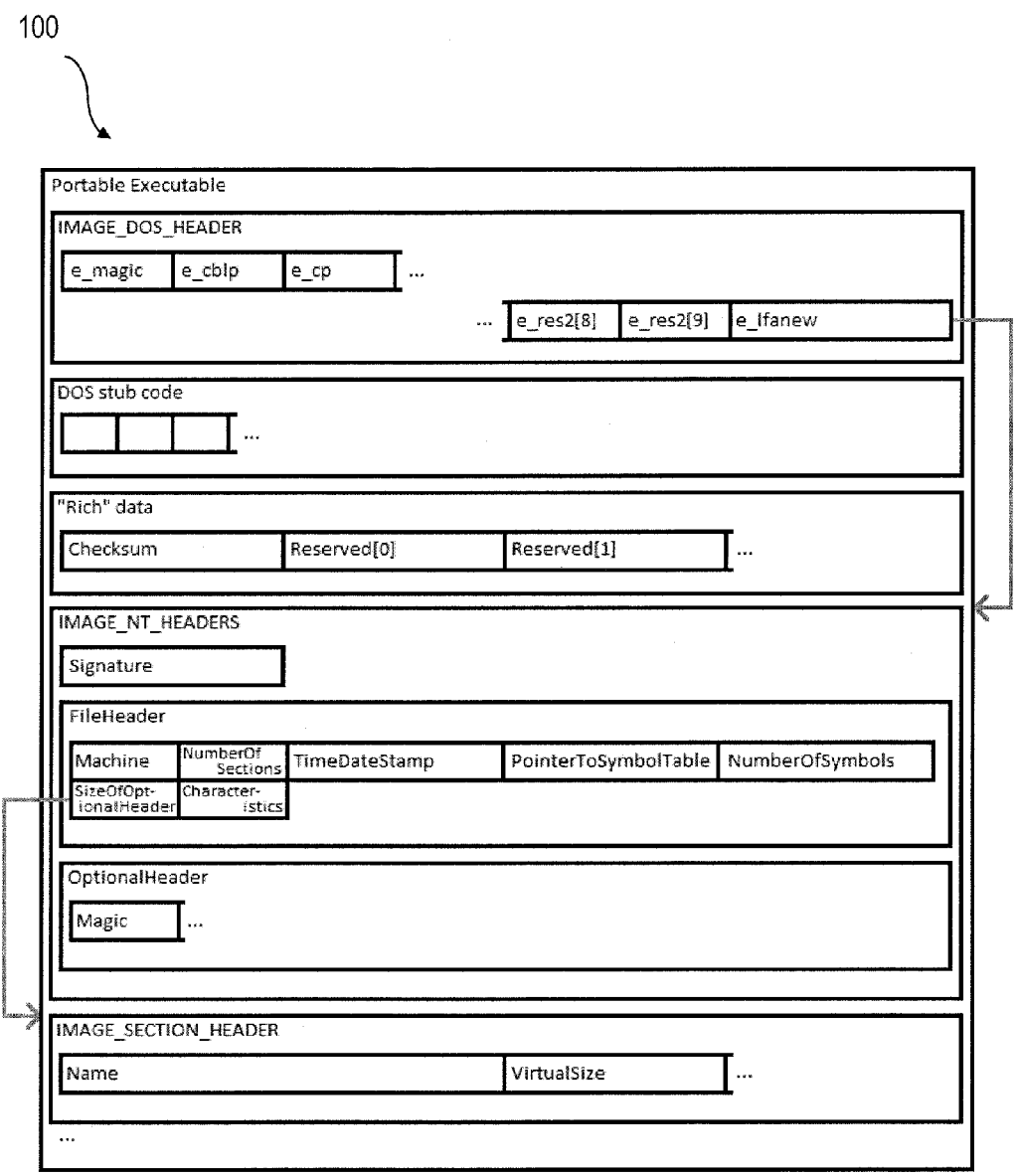
FIG. 1 is a diagram depicting a Portable Executable format file.

FIG. 1 is a diagram 100 that depicts a portion of a Portable Executable format file. In this diagram 100, an example of an unofficially documented structure ("Rich" data) is included, and hierarchy (for example, IMAGE_NT_HEADERS→IMAGE_NT_HEADERS.OptionalHeader→IMAGE_NT_HEADERS.OptionalHeader.Magic) and order (a series of IMAGE_SECTION_HEADER structures) are suggested. The composition of other types of structured files may differ based on the underlying execution environment. For example, DOS executables, NE files, and LE files all begin with a DOS header, but in a NE file, the DOS header references a NE-specific header, while in a LE file it references a LE-specific header. An ELF file, meanwhile, begins with a distinct ELF header which in turn references additional ELF-specific headers and tables.

Figure 2:
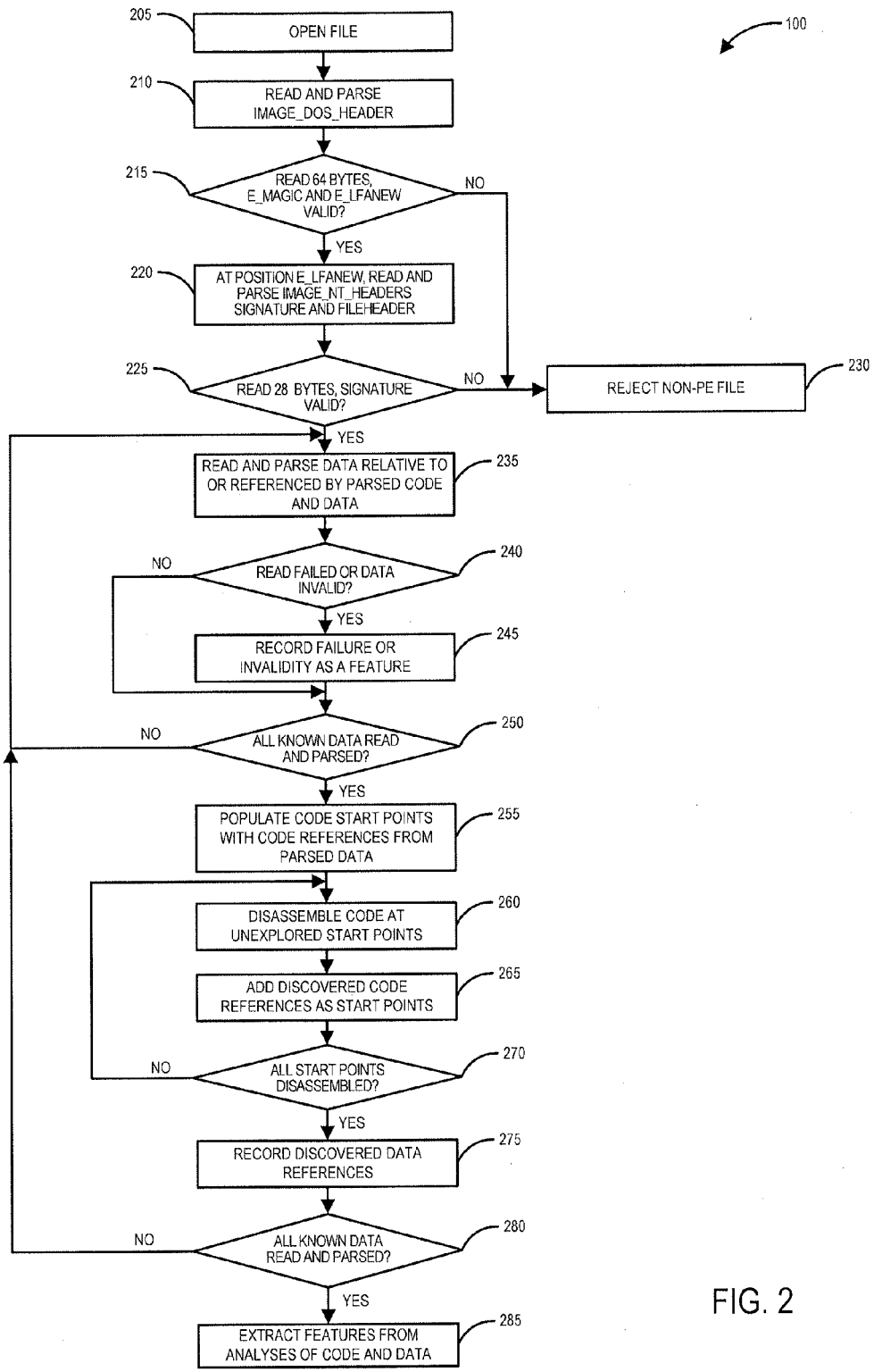
FIG. 2 is a first process flow diagram illustrating extraction of features from code and data within a structured file.

FIG. 2 is a process flow diagram 200 depicting extraction of features from a structured file. In this particular example, the structured file is a PE containing code as well as data (which includes metadata and resources); other variations can be implemented for other types of structured files. Initially, at 205, processing of a PE begins by opening a PE file for reading from secondary storage (either local or from a remote source) or by downloading the PE file or otherwise gaining programmatic access to the bits constituting a PE. Hereafter, access to the PE is conceptualized as a stream of bytes. In diagram 200 of FIG. 2, opening the PE is assumed to succeed; if it fails, the PE would be rejected. Thereafter, at 210, the DOS header of the PE file can be read. A DOS header can be a defined structure 64 bytes in size, comprising a number of fields. The DOS header read can then, at 215, be checked. If fewer than 64 bytes were read (or other pre-defined threshold), if a first portion of the DOS header (e.g., the e_magic field which comprises the first two bytes of the DOS header) does not contain an expected signature, or a second portion of the DOS header (e.g., the e_lfanew field which comprises the 61st through 64th bytes of the DOS header) constitutes an invalid value (for instance, if they indicate an offset outside of the file), the PE can, at 230, be rejected. If a valid DOS header was successfully read at 215, then at 220 the read position of the stream can be moved to the absolute position indicated by the DOS header's e_lfanew field, and the first portion of the PE header is read. The PE header can comprise a four-byte Signature field, a 24-byte FileHeader substructure, and a variable-length OptionalHeader substructure (which is not shown being read in this step but would be identified as adjacent data and read at 235). Next, at 225, the portion of the PE header read at 220 can be checked. If fewer than 28 bytes were read, or if the Signature field does not contain an expected signature, the PE can be rejected at 230. If a check at 215 or 225 is not satisfied, then at 230 the PE is determined to not actually be a valid PE and is rejected. Other PE validation steps can be utilized depending on the desired implementation.

FIG. 2 can include a loop in 235 through 280 that can read and parse code and data and discover additional code and data. A structure which was previously discovered (at some known position in the PE, at a position discovered by scanning the PE, at a position referenced by other code or data, or at a position relative to other code or data) can, at 235, be read and parsed. Conceptually, the DOS header is the root structure, located at the known position of 0, and it references the PE header, while the Rich data (if present) is located relative to the DOS header. The PE header, in turn, references or is adjacent to other code and data, which reference or are adjacent to other code and data, and so on. The reading and data-specific parsing of 235 can, at 240, then be checked. If the check at 240 indicates that the read at 235 was incomplete or failed, or if the parsing at 235 determined that the data is invalid, then at 245, information about the failure or invalidity is recorded as a feature for that data. The queue of discovered data can then, at 250, be checked. If data has been discovered but reading and parsing has not yet been attempted, another iteration of the loop can begin at 235. If the check at 250 indicates that all discovered data has been read and parsed, then at 255, code start points can be extracted from the data, typically from data fields known to reference code. Often, the exploration of many code start points will be necessary to discover all of the code in a PE, as any single start point might only lead to a subset of the code in the PE. Subsequently, at 260, any code start points that have not already been explored can be used as starting points for disassembly. Many forms of code be disassembled, including native machine code (e.g., x86, x64, or ARM instructions), .NET Intermediate Language, and VisualBASIC p-code. Code start points discovered during the disassembly pass of 260 can then, at 265, be added to the set of code start points that need to be considered. (Like data, code of course also needs to be read from the PE before it can be disassembled, and these reads could also fail, but this consideration was omitted from FIG. 2.) The set of outstanding code start points can, at 270, be checked. If any known start points have not been covered by disassembly, the disassembly loop can continue at 260. Data references discovered during disassembly can, at 275, be added to the queue of data to be read and parsed. The queue of discovered data can, at 280, be checked (just like at 250). If data has been discovered but reading and parsing has not yet been attempted, another iteration of the loop can begin at 235. (In practice, code and data discovery can be more commingled than depicted in FIG. 2, although disassembly in particular is often improved when data such as relocations and runtime function information is made available.)

Next, at 285, all data and code are assumed to have been parsed and disassembled, so features can then be extracted. In many cases, feature extraction benefits from having a comprehensive understanding of all code and data in the PE, as opposed to being performed while code and data are still being discovered.

In a structured file format (e.g., PE file format), data is typically arranged hierarchically, with a top-level header encapsulating another structure, which encapsulates another structure, and so on. Data is also almost always explicitly ordered according to its position in the file; sometimes a specific ordering is demanded by the specification, while other times the ordering is arbitrary. By default, the current feature extraction maintains both hierarchy and order (see FIG. 3), although there are special cases in which explicitly representing hierarchy and/or order would be redundant or undesirable.

FIG. 3 is a diagram 300 including representation of first-order PE features, formatted in JavaScript Object Notation (JSON). In diagram 300, hierarchy is represented by nesting JSON objects; nested fields may then be referenced via a name that specifies a path through the hierarchy, such as "IMAGE_NT_HEADERS.OptionalHeader.Magic". Order is represented by the use of JSON arrays, such as the array of IMAGE_SECTION_HEADER structures. In actual output, the ellipses following field names would be replaced by the values of those fields.

In some cases, it can be useful to transform features extracted from the structured files. One general class of transformation is sanitization, in which unpredictable and typically unfrosted data is made safer to handle. When the goal is to avoid extracting an unwieldy amount of potentially bogus data (for instance, from a possibly malformed structured file), the data can be truncated to a reasonable maximum and the reason for truncation noted as a feature. Truncation can be triggered by a condition more complex than a size check: in the case of textual feature extraction, for example, the composition of the text can be taken into account, checking for non-printable characters, invalid encodings, and mixtures of languages. Another form of sanitization that can be used is escaping or encoding data in an unambiguously reversible way. Encoding, in this regard, can be useful when the data could contain characters with special meanings elsewhere in the system or raw bytes that do not necessarily represent a single Unicode code point.

In other cases, an alternative representation of a first-order feature can be offered, in order to codify knowledge about how that feature is typically interpreted. For example, if a single integer field partially or wholly comprises bit flags (as in the case of "IMAGE_NT_HEADERS.FileHeader.Characteristics"), those bits can be extracted as features ("Characteristics_flag1", "Characteristics_flag2", and so on) in place of or in addition to the integral value. In another example, a field's value can be expressed as a ratio, dividing it by a second field's value or a constant upper bound so that the resulting feature is represented as a normalized real number instead of an integer on an arbitrary scale. Hashing can also be used in some cases to reduce a potentially unbounded amount of data (such as a blob of resource data) into a small, fixed-size value suitable for comparison with a list of anticipated values.

While these first-order features are demonstrably valuable, feature extraction can be further improved by processing some of the first-order features and other basic content of a structured file into higher-order features. In one example, whether or not a collection of import names is ordered lexicographically (a trait common in certain PE families) can be represented as a Boolean feature. A typical machine learning algorithm could not be expected to automatically identify that such an ordering should be detected and has significance, and therefore this domain expertise can be codified as logic which produces a feature. In another example, the correct checksum for a string of elements in the structured file can be computed and compared to the checksum stored in a field in the structured file, representing as features whether the two match and in what way they differ (i.e., which element or elements appear to have been modified after the stored checksum was calculated). In a third example, a set of timestamp fields from the structured file can be checked to determine which among the valid timestamps is the earliest, and it can be represented as Boolean features whether or not the structured file relies upon various functionalities that did not exist at the time represented by the most recent timestamp.

A machine learning model, as used herein, can be trained by executing various machine learning algorithms with a large set of samples as input. For the sake of this discussion, a sample is the set of features extracted from a structured file. Through the training process, the model comes to reflect the relative value of each feature in classifying all samples, whether or not they were part of the training set. (Here, classification refers to placing a sample into a category, which in a computer security context might include malicious/benign or dropper/keylogger/ransomware/spyware/worm.) In general, accuracy of the model (the avoidance of misclassifications such as false negative and false positive errors) can often be improved by supplying the machine learning algorithms with as many quality features as possible extracted from as many representative samples as possible. Therefore, feature extraction should present comprehensive information from throughout the breadth and depth of the file, including "higher-order" features based on the processing of other features as instructed by domain expertise.

Figure 4:
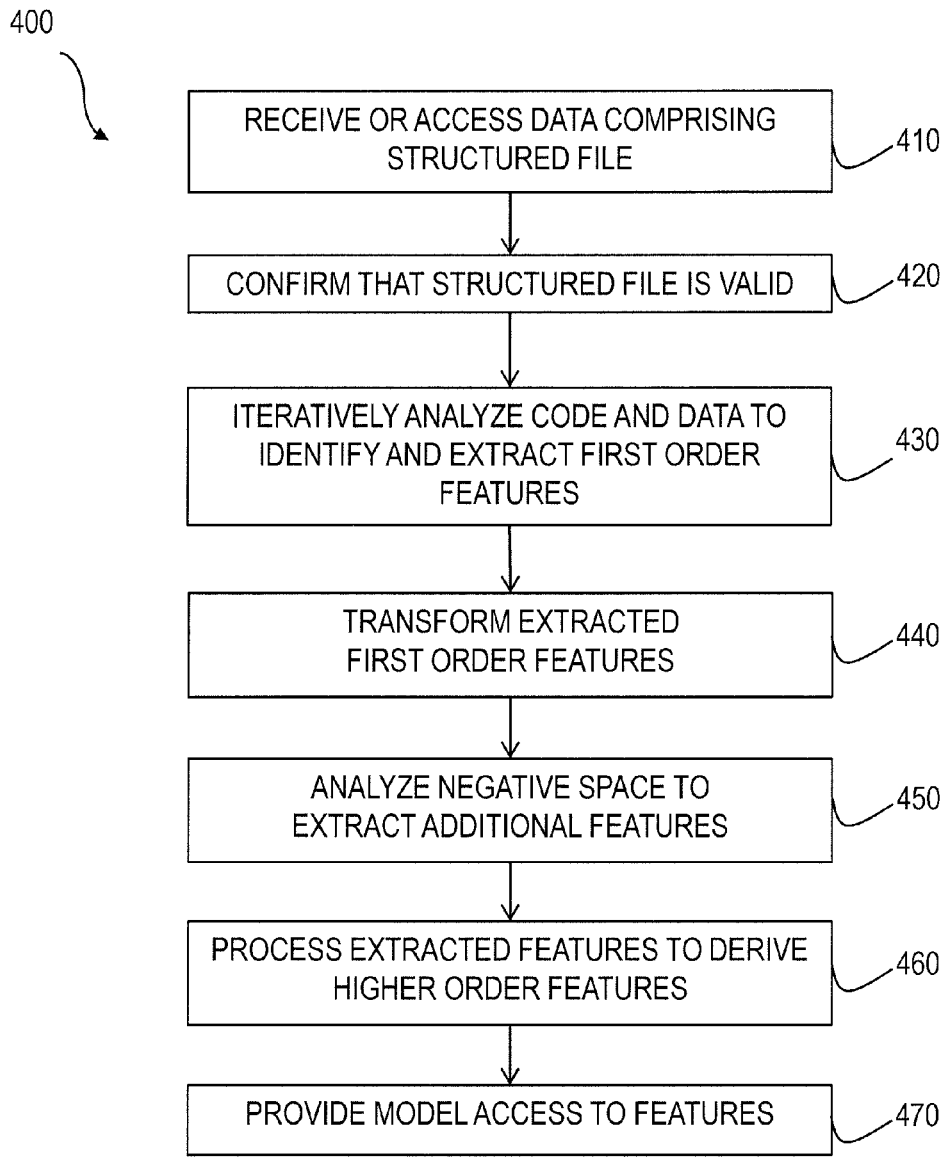
FIG. 4 is a second process flow diagram illustrating extraction of features from code and data within a structured file.

FIG. 4 is a process flow diagram 400 illustrating extraction of features from a structured file. Initially, at 410, data is received or otherwise accessed that comprises a structured file encapsulating data required by an execution environment to manage executable code wrapped within the structured file. Thereafter, it can optionally be determined, at 420, whether the structured file is valid. If the structured file is determined not to be valid, the analysis/process can be terminated. Otherwise, at 430, the code and data within the structured file is iteratively analyzed (e.g., parsed and disassembled, etc.) to identify and extract first order features. These first order features are then, at 440, transformed using one or more transformation techniques. In addition, at 450, negative space within the structured file is analyzed to identify any additional features which can then be extracted. The extracted features can then, at 460, be processed such that higher order features are derived. Subsequently, a model (e.g., a machine learning model, etc.) can be provided with the features/with access to the features.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device the method comprising:
   receiving or accessing, by at least one data processor, data comprising a structured file encapsulating data required by an execution environment to manage executable code wrapped within the structured file;
   iteratively identifying, by the at least one data processor, code and data regions in the structured file;
   extracting, by the at least one data processor and based on the identifying, code start points for subsequent use in disassembly;
   extracting, by the at least one data processor using the extracted coded start points, at least one first order feature from the structured file by analyzing at least a portion of the identified code and data regions, the extracted at least one first order feature indicating whether a collection of import names is ordered lexicographically;
   analyzing, by the at least one data processor, negative space within the structured file to extract at least one additional feature, the negative space being different from the identified code and data regions; and
   providing, by the at least one data processor, both of the extracted at least one feature and the extracted at least one additional feature to a machine learning model such that the machine learning model consumes at least a portion of these features.

2. The method of claim 1, wherein the structured file is selected from a group consisting of: Portable Executable (PE) format files, disk operating system (DOS) executable files, New Executable (NE) files, Linear Executable (LE) files, Executable and Linkable Format (ELF) files, JAVA Archive (JAR) files, and SHOCKWAVE/FLASH (SWF) files.

3. The method of claim 1, wherein the execution environment is an operating system or a virtual machine.

4. The method of claim 1, further comprising:
   determining, by the at least one data processor, that the structured file is valid by examining at least one header within the structured file to determine whether it encapsulates a valid signature.

5. The method of claim 1, further comprising:
   deriving, by the at least one data processor, the extracted at least one first order feature into a higher-order feature.

6. The method of claim 1, further comprising:
   transforming, by the at least one data processor, the extracted at least one feature.

7. The method of claim 6, wherein the transforming comprises one or more of:
   sanitizing the extracted at least one feature, or
   truncating the extracted at least one feature.

8. The method of claim 1, wherein the identifying code and data regions in the structured file comprises parsing and disassembling the structured file.

9. The method of claim 1, wherein data within the structured file is arranged hierarchically and the structured file comprises a top level header encapsulating a first data structure that encapsulates a second data structure.

10. The method of claim 1, wherein the iteratively identifying code and data regions in the structured file comprises identifying types of code and/or data regions in the structured file.

11. A non-transitory computer program product storing instructions which, when executed by at least one data processor forming part of at least one computing system, result in operations comprising:
   receiving or accessing data comprising a structured file encapsulating data required by an execution environment to manage executable code wrapped within the structured file;
   iteratively identifying code and data regions in the structured file;
   extracting, based on the identifying, code start points from the data for subsequent use in disassembly;
   extracting at least one first order feature from the structured file by analyzing at least a portion of the identified code and data regions, the extracted at least one first order feature indicating whether a collection of import names is ordered lexicographically;
   analyzing negative space within the structured file to extract at least one additional feature, the negative space being different from the identified code and data regions; and providing both of the extracted at least one feature and the extracted at least one additional feature to a machine learning model such that the machine learning model consumes at least a portion of these features.

12. The computer program product of claim 11, wherein the structured file is selected from a group consisting of: Portable Executable (PE) format files, disk operating system (DOS) executable files, New Executable (NE) files, Linear Executable (LE) files, Executable and Linkable Format (ELF) files, JAVA Archive (JAR) files, and SHOCKWAVE/FLASH (SWF) files.

13. The computer program product of claim 11, wherein the execution environment is an operating system or a virtual machine.

14. The computer program product of claim 11, wherein the operations further comprise:
  determining that the structured file is valid by examining at least one header within the structured file to determine whether it encapsulates a valid signature.

15. The computer program product of claim 11, wherein the operations further comprise:
  deriving the extracted at least one first order feature into a higher-order feature.

16. The computer program product of claim 11, wherein the operations further comprise:
  transforming the extracted at least one feature.

17. The computer program product of claim 16, wherein the transforming comprises one or more of:
  sanitizing the extracted at least one feature, or
  truncating the extracted at least one feature.

18. The computer program product of claim 11, wherein the identifying code and data regions in the structured file comprises parsing and disassembling the structured file.

19. The computer program product of claim 11, wherein data within the structured file is arranged hierarchically and the structured file comprises a top level header encapsulating a first data structure that encapsulates a second data structure.

20. The computer program product of claim 11, wherein the iteratively identifying code and data regions in the structured file comprises identifying types of code and/or data regions in the structured file.

21. A system comprising:
  at least one data processor; and
  memory storing instructions which, when executed by the at least one data processor, result in operations comprising:
    receiving or accessing data comprising a structured file encapsulating data required by an execution environment to manage executable code wrapped within the structured file;
    iteratively identifying code and data regions in the structured file;
    extracting, based on the identifying, code start points from the data for subsequent use in disassembly;
    extracting at least one feature from the structured file by analyzing at least a portion of the identified code and data regions, the extracted at least one first order feature indicating whether a collection of import names is ordered lexicographically;
    analyzing negative space within the structured file to extract at least one additional feature, the negative space being different from the identified code and data regions; and
    providing both of the extracted at least one feature and the extracted at least one additional feature to a machine learning model such that the machine learning model consumes at least a portion of these features.

22. The system of claim 21, wherein the structured file is a Portable Executable (PE) format files, and
  wherein the extracted features are consumed by the machine learning model without intermediate processing.

23. The method of claim 1, wherein the extracting comprises: computing a correct checksum for a string of elements and comparing the computed checksum to a checksum stored in a field in the structured file.

24. The method of claim 1, wherein the extracting comprises: checking a plurality of timestamps within the structured file to determine which of the timestamps is earliest and representing the timestamps as Boolean features that indicate whether or not the structured file relies upon functionalities that did not exist at a time represented by a most recent timestamp.

25. A method for implementation by one or more data processors forming part of at least one computing device, the method comprising:
  receiving or accessing, by at least one data processor, data comprising a structured file
  confirming, by the at least one data processor, that the structured file is valid;
  iteratively analyzing, by the at least one data processor, code and data within the structured file to identify and extract first order features, the code and data further comprising code start points for use in disassembly, at least one of the extracted first order features indicating whether a collection of import names is ordered lexicographically;
  transforming, by the at least one data processor, at least one extracted first order features from the structured file;
  analyzing, by the at least one data processor and subsequent to the transforming, negative space within the structured file to extract additional features;
  processing, by the at least one data processor, the extracted additional to derive higher order features; and
  providing, by the at least one data processor, the features to a machine learning model to determine whether at least one portion of the structured file is likely to comprise malicious code.

* * * * *